United States Patent
Tanwar (10) Patent No.: US 9,753,753 B2
(45) Date of Patent: Sep. 5, 2017

(54) DYNAMIC JAVA MESSAGE SERVICE EMULATOR

(71) Applicant: Abhishek Kumar Tanwar, Bangalore (IN)

(72) Inventor: Abhishek Kumar Tanwar, Bangalore (IN)

(73) Assignee: WIPRO LIMITED, Bangalore (IN)

( * ) Notice: Subject to any disclaimer, the term of this patent is extended or adjusted under 35 U.S.C. 154(b) by 24 days.

(21) Appl. No.: 14/745,732

(22) Filed: Jun. 22, 2015

(65) Prior Publication Data

US 2016/0274925 A1    Sep. 22, 2016

(30) Foreign Application Priority Data

Mar. 17, 2015 (IN) .......................... 1314/CHE/2015

(51) Int. Cl.
  *G06F 11/36*   (2006.01)
  *G06F 9/455*   (2006.01)

(52) U.S. Cl.
  CPC .......... *G06F 9/45508* (2013.01); *G06F 11/36* (2013.01); *G06F 11/3664* (2013.01); *G06F 11/3672* (2013.01)

(58) Field of Classification Search
  CPC .......................... G06F 9/455–9/45508; G06F 11/3664–11/3672
  See application file for complete search history.

(56) References Cited

U.S. PATENT DOCUMENTS

| 5,809,286 A * | 9/1998 | McLain, Jr. ........ H04M 3/2254 |
| | | 703/23 |
| 7,000,224 B1 * | 2/2006 | Osborne, II ........ G06F 11/3688 |
| | | 714/738 |

(Continued)

OTHER PUBLICATIONS

Alwin Ibba, "Mockrunner—Unit Testing of J2EE Applications", *Lectures Notes in Computer Science: 5th International Conference Proceeding in Extreme Programming and Agile Processes in Software Engineering*, Springer-Verlag Berlin, Germany, Jun. 10, 2004, pp. 254-257. 4 pages.

(Continued)

*Primary Examiner* — Tuan Q. Dam
*Assistant Examiner* — Zheng Wei
(74) *Attorney, Agent, or Firm* — Finnegan, Henderson, Farabow, Garrett & Dunner LLP (57) ABSTRACT

This disclosure relates generally to systems integration testing (SIT), and more particularly to dynamic java message service emulator. In one embodiment, non-transitory computer-readable medium storing computer-executable trend analysis instructions is provided. The instructions may include instantiating, via one or more hardware processors, a dynamic enterprise java bean. The instructions may also include receiving, via the one or more hardware processors, a request at the dynamic enterprise java bean. The instruction may include generating, via the one or more hardware processors, a query for business rules based on the request. Additionally, the instructions may include configuring, via the one or more hardware processors, the dynamic enterprise java bean using the business rules. The instructions may further include processing, via the one or more hardware processors, the request using the configured dynamic enterprise java bean to generate a response.

23 Claims, 3 Drawing Sheets

(56) References Cited

U.S. PATENT DOCUMENTS

| | | | |
|---|---|---|---|
| 7,337,431 B1* | 2/2008 | Barnes | G06F 11/3664 714/E11.207 |
| 7,380,248 B1* | 5/2008 | Isenberg | G06F 9/542 719/314 |
| 7,702,691 B2* | 4/2010 | White | G06F 17/30286 707/781 |
| 7,814,470 B2 | 10/2010 | Mamou et al. | |
| 7,831,962 B2* | 11/2010 | Banerjee | G06F 11/3696 717/126 |
| 7,882,492 B2* | 2/2011 | Viswanadha | G06F 11/3664 717/124 |
| 8,065,219 B2* | 11/2011 | Haynie | G06Q 10/10 705/37 |
| 8,161,500 B2 | 4/2012 | Tan et al. | |
| 8,245,201 B2* | 8/2012 | Genkin | G06F 11/3672 717/126 |
| 9,038,093 B1* | 5/2015 | Leonard | G06F 9/546 719/314 |
| 9,183,113 B2* | 11/2015 | Smiljanic | G06F 11/3664 |
| 2003/0046639 A1* | 3/2003 | Fai | G06Q 10/10 |
| 2005/0262135 A1* | 11/2005 | White | G06F 17/30286 |
| 2005/0283763 A1* | 12/2005 | Fujikawa | G06F 11/3696 717/124 |
| 2006/0036448 A1* | 2/2006 | Haynie | G06Q 10/10 705/37 |
| 2006/0101474 A1* | 5/2006 | Magown | G06F 9/5027 719/315 |
| 2006/0195471 A1* | 8/2006 | Newport | G06F 9/4428 |
| 2006/0248511 A1* | 11/2006 | Sanjar | G06F 11/3664 717/124 |
| 2007/0198970 A1 | 8/2007 | Horii et al. | |
| 2007/0277158 A1* | 11/2007 | Li | G06F 8/24 717/135 |
| 2008/0295064 A1 | 11/2008 | Mitra et al. | |
| 2009/0089039 A1 | 4/2009 | Shufer et al. | |
| 2009/0210862 A1* | 8/2009 | Viswanadha | G06F 11/3664 717/125 |
| 2010/0299680 A1* | 11/2010 | Macgaffey | G06Q 40/04 719/328 |
| 2013/0055294 A1 | 2/2013 | Diebner et al. | |
| 2013/0061210 A1* | 3/2013 | Chung | G06F 11/3664 717/125 |
| 2014/0223418 A1* | 8/2014 | Michelsen | G06F 11/3696 717/135 |
| 2014/0343918 A1* | 11/2014 | Grgic | G05B 19/042 703/23 |
| 2016/0217159 A1* | 7/2016 | Dahan | G06F 17/30289 |

OTHER PUBLICATIONS

European Search Report dated Jul. 28, 2016 in European Patent Office in counterpart European Patent No. Application 16159528.5. 9 pages.

* cited by examiner

DYNAMIC JAVA MESSAGE SERVICE EMULATOR

PRIORITY CLAIM

This U.S. patent application claims priority under 35 U.S.C. §119 to: Indian Application No. 1314/CHE/2015, filed on Mar. 17, 2015. The aforementioned application is incorporated herein by reference in its entirety.

TECHNICAL FIELD

This disclosure relates generally to systems integration testing (SIT), and more particularly to Dynamic Java Message Service Emulator.

BACKGROUND

Computer systems no longer operate in isolation. Many systems depend upon third party services to function properly. To facilitate effective collaboration, developers may perform SIT to verify that packages interconnect properly prior to determining whether applications meet customer needs (e.g., via user acceptance testing (UAT)).

For example, when a company develops a new module or service for an existing system, the module may be integrated into the application and database layers of the existing system. SIT ensures that new modules properly interface with existing applications and databases, while permitting preexisting functions to continue normal operations. Users benefit from discovering potential interference caused by new modules prior to actual deployment, as SIT prevents system downtime caused by integration problems.

SUMMARY

In one embodiment, a non-transitory computer-readable medium storing computer-executable trend analysis instructions is disclosed. The instructions may include instantiating, via one or more hardware processors, a Dynamic Enterprise Java Bean. The instructions may also include receiving, via the one or more hardware processors, a request at the Dynamic Enterprise Java Bean. Further, the instructions may include generating, via the one or more hardware processors, a query for business rules based on the request. The instructions may include configuring, via the one or more hardware processors, the Dynamic Enterprise Java Bean using the business rules. Additionally, the instructions may include processing, via the one or more hardware processors, the request using the configured Dynamic Enterprise Java Bean to generate a response. The instructions may also include providing, via the one or more hardware processors, the response as an output of the configured Dynamic Enterprise Java Bean.

Additional embodiments may disclose a non-transitory computer-readable medium storing computer-executable trend analysis instructions or a system comprising at least one hardware processor and memory to implement the method discussed above.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

In developing integrated systems, developers may perform SIT based on an interface specification shared between the systems. Alternatively or additionally, integration may utilize stubs and drivers for top-down integration testing. Each system may have a dedicated interference specification and/or stub. In either case, the specification and/or stub may facilitate acknowledgments clarifying whether the external system has received and/or processed data from modules. An improved framework to manage system integrations may result in efficient configurations and business logic based on the target and/or source interface specification.

After testing systems in isolation, SIT tests interactions between different systems. SIT may verify proper execution of software components and certify accurate interfacing between components within a system. SIT may operate with the objective of validating all software module dependencies. For example, SIT may indicate that interdependent systems function appropriately and that systems maintain data integrity between separate modules for an entire solution. Currently, verification processes utilize SIT after developers spend significant effort integrating new features into a system. Because the system is integrated prior to testing, any issues uncovered during the course of SIT may require iterative reintegration to fix any issues uncovered during testing. Thus, SIT is currently limited because testing cannot be performed prior to the actual integration phase, subjecting the system to undue risks and also increasing the time needed to fix issues in integration phase.

Systems may implement EJBs (Enterprise Java Beans) to facilitate integration. Each system may have a dedicated EJB to enable message processing. However, when SIT accomplishes a task, the output may be manually verified. Further, even when the response is processed an automated manner, delays may require manual intervention.

Disclosed embodiments may provide a framework to better manage system integrations with efficient configurations and business logic. Target and/or source interface specifications may serve as the basis for the configurations and logic.

The disclosed embodiments may be related to Dynamic Java Message Service (JMS) Emulators. Disclosed systems and methods may provide dynamic configuration without requiring manually customized code for the addition or deletion of a new system integration. A dynamic configuration process may modify Extensible Markup Language (XML) configurations or other equivalent instructions. The present disclosure discusses the use of open standards such as Java Message Service (JMS), Enterprise JavaBeans (EJB), and XQuery, which may be combined in disclosed embodiments.

Disclosed embodiments may utilize and combine open standards (e.g., JMS, EJB, XQuery) to achieve target integrations. Disclosed embodiments may allow dynamic configuration without having to write additional code to add or delete new system integration. For instance, disclosed embodiments may accomplish integration by modifying only XML configurations. Additional code customizations outside the XML configuration data may not be necessary. An embodiment may use additional business rules outside of the framework, on the fly, without any deployment. XQuery scripts may convey rules, such as business rules. Disclose embodiments may apply input-based or logic-based business rules to respond to input requests. Disclosed embodiments may log the input and/or output details for further monitoring and verification. Additionally, disclosed embodiments may manage real-time configurations to allow the system integration respond in a pre-configured duration to enable the system delay.

Illustrative embodiments of the present disclosure are listed below. In one embodiment, an integration testing system. In another embodiment, a systems integration process is disclosed. The system and method may enhance system integration by reducing delays cause by iterative integration problem solving. The system and method may be used in combination or independently. For example, disclosed processes may be performed using different devices and systems. Disclosed systems may be used to perform other processes.

Figure 1:
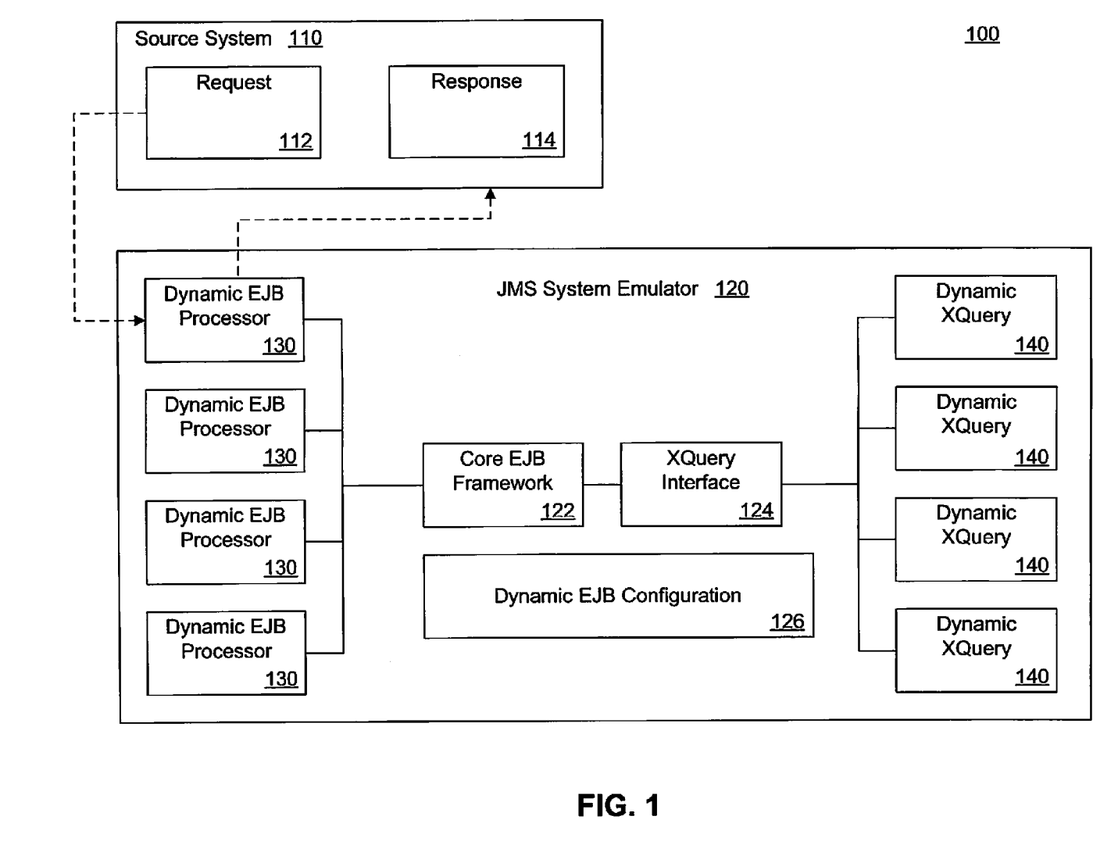
FIG. 1 illustrates an exemplary integration testing system according to some embodiments of the present disclosure.

FIG. 1 illustrates an exemplary integration testing system 100 according to some embodiments of the present disclosure. Integration testing system 100 may include JMS system emulator, which may be made of various processors or modules. The depicted functional blocks may be implemented using one or more hardware processors, such as application specific integrated circuits (ASICs). In other embodiments, the functional blocks may include hardware performing processes based on instructions. In other embodiments, the functional blocks may perform processes using software or virtualized hardware. Combinations of various hardware and/or software may be used to implement the disclosed functional blocks. These combinations may rely on specific, customized solutions.

Integration testing system 100 may include source system 110. In an embodiment, a server to facilitate integration may act as source system 110. For example, source system 110 may have a module to integrate into existing locally-hosted systems.

Source system 110 may generate request 112. In an embodiment, request type of request 112 may depend on source system 110. For example, request 112 may be a J2EE (Java 2 Platform Enterprise Edition) application sending message to a queue. In another embodiment, an industry standard COTS (Commercial Off The Shelf) product may act as request 112, which may depend, in whole or part, on JMS communication such as OSM (order and service management).

System 100 may include business rules. In an embodiment, the business rules are stored in a format that may be read by dynamic XQuery scripts 140. For example, the rules may be input-based business rules and/or logic-based business rules. The rules may be configured by an authorized person. For example, system 100 may include a user interface to receive, store, and propagate user rule preferences. Input hardware may receive user input indicating how specific rules may apply. System 100 may receive user input from input hardware and store the input as business rules.

In an embodiment, business rules may be incorporated in a compatible format. For example, business rules may be compatible with XQuery using an external input from an authorized user. The incorporated business rules may be provided directly to system 100. An external or internal database may store the incorporated business rules. System 100 may fetch the rules from the storage location, as necessary. In an embodiment, system 100 may prefetch or locally cache frequently used business rules.

In an embodiment, the business rules may be provided to system 100 using a Handle to the XQuery. Any business rule may be incorporated by using the disclosed framework. The framework may incorporate validations and error responses into business rules. For example, the XQuery handle can have a business rule for validating a number of parameters and may return error responses when the validations fail. XQuery interface 124 may interface between the XQuery scripts 140 and EJB framework 122.

EJB framework 122 may include dynamic EJB configuration 126. EJB framework 122 may enable JMS system emulator 120 to incorporate a system by modifying the XML configuration file, without requiring a code build. The XML configuration file may include a definition of the new system which has been added, business rule handler name(s), a queue configuration, and a reply destination, for example.

Dynamic EJB processors 130 may process request 112, based on the information present in the request and the rules, as received from EJB framework 122. JMS system emulator 120 may dynamically create dynamic EJB processors 130. Dynamic EJB processors may refer to core EJB framework 122 upon initiation. Dynamic EJB processor may be configured to receive a request, parse and process the request based on business rule(s) (e.g., by integrating with the XQuery business rule handler), and provide a response if a reply target destination (which can be the source system) is configured. Dynamic EJB processors 130 may perform the processing to test the integration of the systems. For example, Dynamic EJB processors 130 may utilize requests including information about the systems to be tested, their nature of integration and any other related information. The rules may relate to the processing that is currently being performed. Dynamic EJB processors 130 may fetch corresponding rules when processing a request. Dynamic EJB processors 130 may fetch rules by sending a rules request to a corresponding one of XQuery scripts 140, using EJB framework 122.

In an embodiment, dynamic EJB processors 130 may process requests (e.g., request 112) by testing the systems indicated by the request. Based on the results of the test, dynamic EJB processors 130 may create response (e.g., response 114). Dynamic EJB processors 130 may create responses based on a target destination (e.g., at least one of the source system or any other system, as configured). Response 114 may be an XML message. Dynamic EJB processors 130 may send response to source system 110. Dynamic EJB processors 130 may make response 114 available to at least one other system (e.g., a system being used by an administrator or supervisor). Dynamic EJB processors 130 may also store response 114 in a data storage area (e.g., non-volatile memory, a database, etc.). Dynamic EJB processors 130 may also store the corresponding request and the rules in a data storage area. System 100 may recall stored data at any later point in time for monitoring and verification (e.g., to provide to authorized user).

Dynamic EJB processors 130 may perform statistical analysis. In an embodiment, Dynamic EJB processors 130 may analyze data including the response, the request, and the rules. Based on the statistical analysis, dynamic EJB processors 130 may display a dashboard detailing current system integration status. For example, dynamic EJB processors may provide instructions to a user interface to indicate the success or failure of specific integration criteria and duration statistics. System 100 may provide the user interface so that an authorized user may view the dashboard.

In an embodiment, dynamic EJB processors 130 may integrate using Hyper Text Transfer Protocol Web Service (HTTP WS). HTTP WS may enable support for direct system-to-system integration without any middleware. For example, dynamic EJB processors 130 may directly interfaces with systems to facilitate integration.

Source system 110 may queue response 114. For example, source system 110 may receive response 114 from one of dynamic EJB processors 130. Source system 110 may make response 114 available to at least one authorized user. For example, source system 110 may receive requisite permissions provided by a user via a user interface. Source system 110 may verify permissions and then provide response 114 to a user interface for displaying to the authorized user. Source system 110 may store response 114 in a data storage area (e.g., non-volatile memory, a database, etc.). Source system 110 may store response 114 indefinitely. Source system 110 may recall response 114 from a data store, for example, in response to a receiving an authorized user request from a user interface. Source system 110 may monitor and verify user permissions, for example, by interfacing with a networked permissions database.

Figure 2:
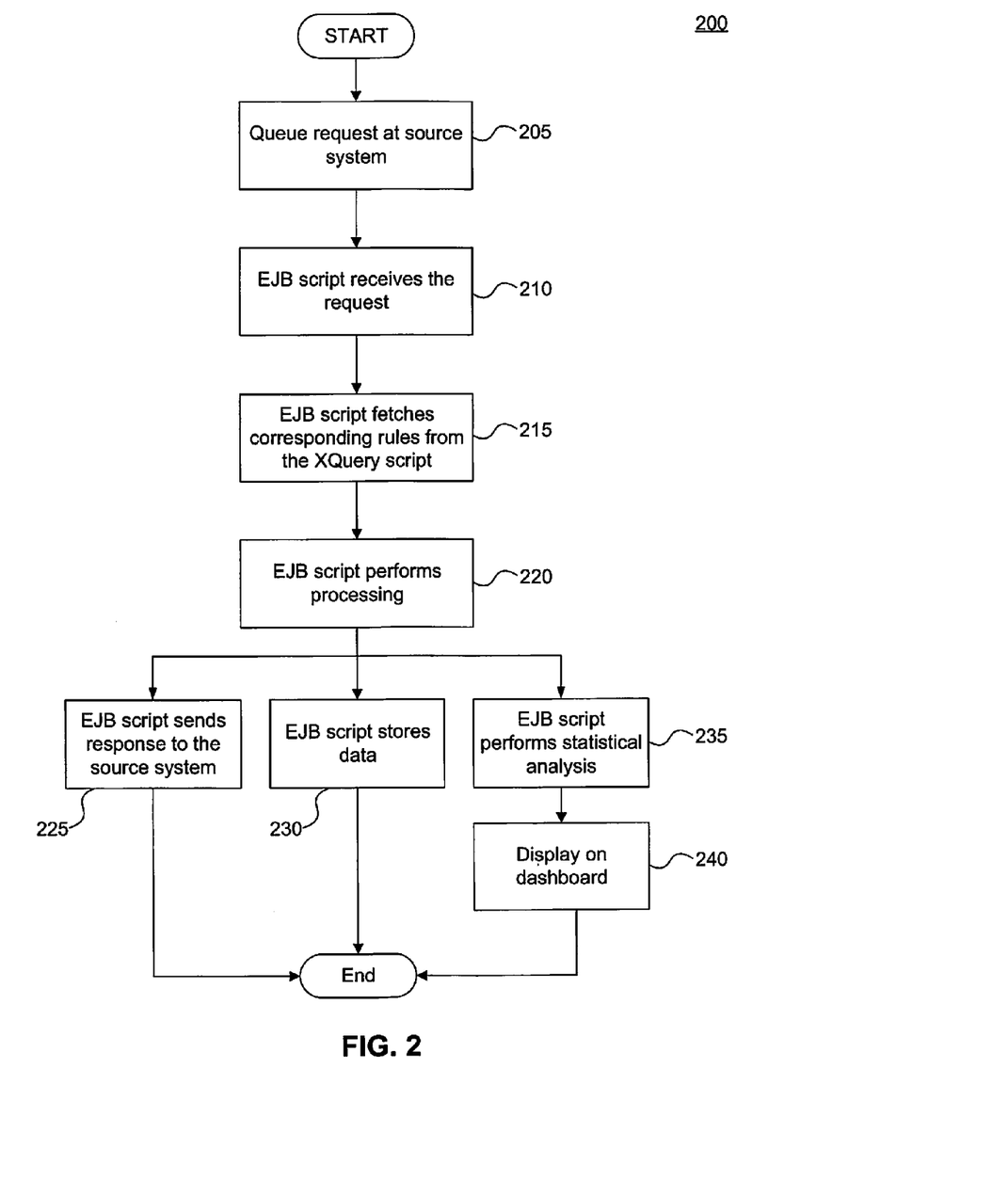
FIG. 2 is a flow diagram illustrating systems integration process in accordance with some embodiments of the present disclosure.

FIG. 2 is a flow diagram illustrating systems integration process 200 in accordance with some embodiments of the present disclosure. The steps of process 200 are illustrated and listed in a particular order. However, this order is not meant to be limiting. For example, steps may be performed in other orders consistent with the disclosure. Further, various steps may be omitted in certain embodiments.

Process 200 may begin with step 205. In step 205, source system 110 may receive request 112. Step 205 may include accepting requests from source system 110. Request 112 may be generated by source system 110 in a suitable format such as XML or any other equivalent means. Source system 110 may queue the requests (step 205). For example, JMS system emulator 120 may accept and/or fetch the requests in a first-in-first-out sequence. System 100 may also accept and/or fetch request 112 in any other suitable manner (e.g., a pre-defined priority level, based on at least one parameter). The request queue may be linked with each message specified with a "Reply To" property using a suitable means such as Message Driven Bean (MDB).

In step 210, JMS system emulator 120 may initiate a dynamic EJB processor (e.g., one of dynamic EJB processors 130) for request 112. JMS system emulator 120 may provide request 112 to the corresponding dynamic EJB processor after initiation.

In step 215, the corresponding dynamic EJB processor may request rules from a corresponding one of dynamic XQuery scripts 140. System 100 may include business rules, which are stored in a format so as to be read by dynamic XQuery scripts 140. For example, JMS system emulator 120 may retrieve incorporated business rules from a memory location. JMS system emulator 120 may provide the business rules using a Handle to the XQuery. XQuery interface 124 may interface between dynamic XQuery scripts 140 and EJB framework 122. EJB framework 122 may include a dynamic EJB configuration to provide to the corresponding dynamic EJB processor.

In step 220, the corresponding dynamic EJB processor (e.g., of dynamic EJB processors 130) processes the request. In an embodiment, the corresponding dynamic EJB processor may utilize the information present in the request and the rules, as received from EJB framework 122. For example, the corresponding dynamic EJB processor may receive a request, parse and process the request based on business rules. Dynamic EJB processors 130 may integrate with an XQuery business rule handler to provide a response when a reply target destination (e.g., source system 110) is configured. The corresponding EJB processor may process the request by testing the integration of the systems. For example, the request may include information about test systems, along with the type of integration and any other related information.

The corresponding EJB processor may process the request by testing the systems indicated by the request. In step 225, the corresponding EJB processor may send the results of the test to source system 110. For example, the corresponding EJB processor may create a response (e.g., response 114). The response may be based on the target destination (e.g., source system 110 and/or other systems). The corresponding EJB processor may provide the response to other system(s).

The corresponding EJB processor may store the response (step 230). For example, a data storage area, such as a non-volatile memory or a database, may store response 114. In some embodiments, step 230 may include the dynamic EJB processor storing the corresponding request and the rules in a data storage area. System 100 may interact with an authorized user via a user interface to access the stored data for monitoring and verification. System 100 may restrict access based on user permissions.

In step 235, the corresponding EJB processor can perform statistical analysis on data involved with the integration test (e.g., the response, the request, and the rules). Based on the statistical analysis, the corresponding EJB processor may provide the analysis results to an interface for display (step 240). For example, the corresponding EJB processor may facilitate the display of a dashboard detailing current system integration status including statistics such as, for example, a status for integration parts (e.g., "success", "failure", "pending", etc.) and timing data. The user interface may provide the dashboard data to an authorized user.

Figure 3:
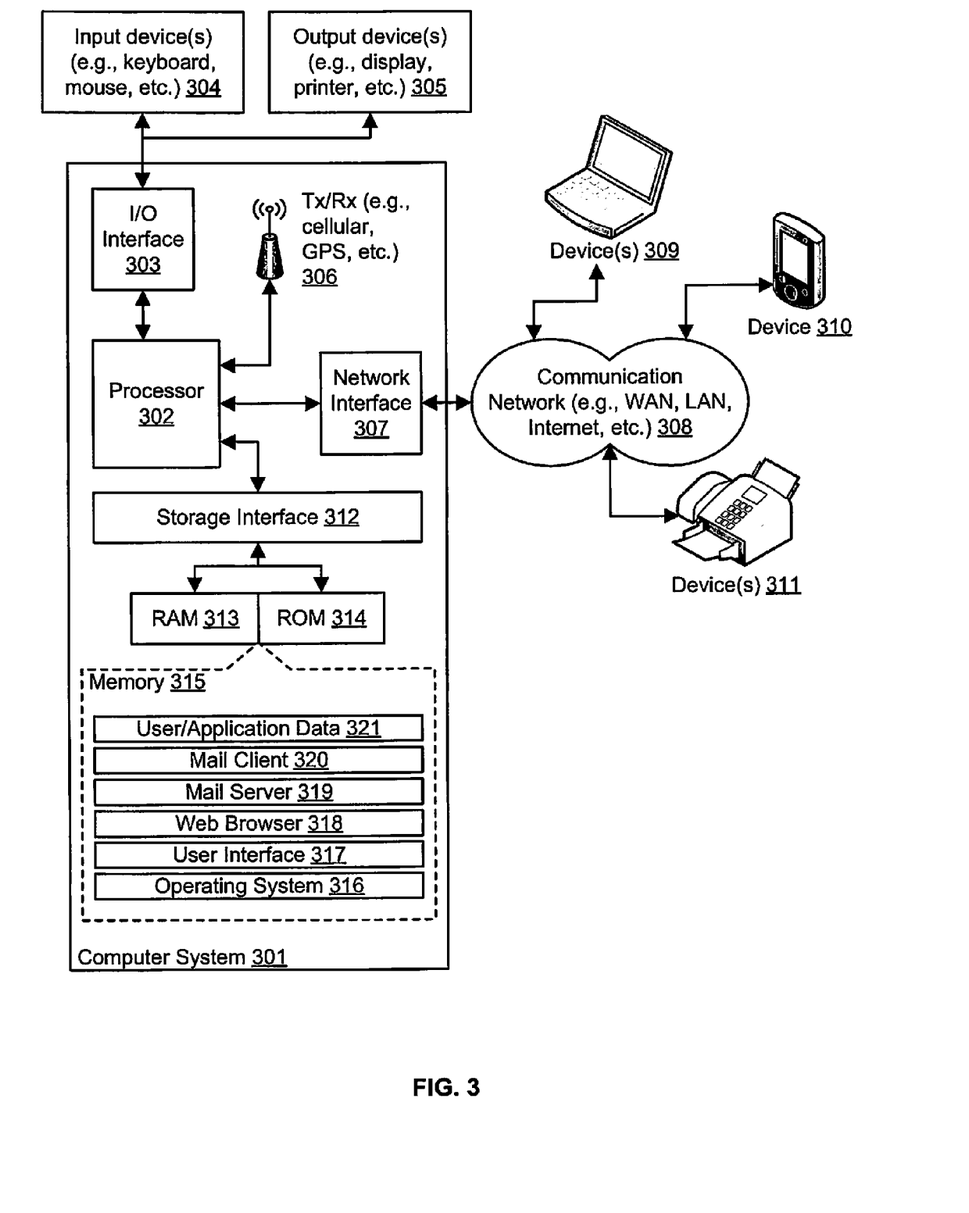
FIG. 3 is a block diagram of an exemplary computer system for implementing embodiments consistent with the present disclosure.

FIG. 3 is a block diagram of an exemplary computer system for implementing embodiments consistent with the present disclosure. Variations of computer system 301 may be used for implementing source system 110, JMS system emulator 120, core EJB framework 122, XQuery interface 124, dynamic EJB configuration 126, dynamic EJB processors 130, and dynamic XQuery scripts 140. Computer system 301 may comprise a central processing unit ("CPU" or "processor") 302. Processor 302 may comprise at least one data processor for executing program components for executing user- or system-generated requests. A user may include a person, a person using a device such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 302 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 302 may be disposed in communication with one or more input/output (I/O) devices via I/O interface 303. The I/O interface 303 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.11 a/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 303, the computer system 301 may communicate with one or more I/O devices. For example, the input device 304 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, gyroscope, proximity sensor, or the like), stylus, scanner, storage device, transceiver, video device/source, visors, etc. Output device 305 may be a printer, fax machine, video display (e.g., cathode ray tube (CRT), liquid crystal display (LCD), light-emitting diode (LED), plasma, or the like), audio speaker, etc. In some embodiments, a transceiver 306 may be disposed in connection with the processor 302. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 302 may be disposed in communication with a communication network 308 via a network interface 307. The network interface 307 may communicate with the communication network 308. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 308 may include, without limitation, a direct interconnection, local area network (LAN), wide area network (WAN), wireless network (e.g., using Wireless Application Protocol), the Internet, etc. Using the network interface 307 and the communication network 308, the computer system 301 may communicate with devices 310, 311, and 312. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 301 may itself embody one or more of these devices.

In some embodiments, the processor 302 may be disposed in communication with one or more memory devices (e.g., RAM 313, ROM 314, etc.) via a storage interface 312. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc. Variations of memory devices may be used for implementing, for example, source system 110, JMS system emulator 120, and databases associate therewith.

The memory devices may store a collection of program or database components, including, without limitation, an operating system 316, user interface 317, web browser 318, mail server 319, mail client 320, user/application data 321 (e.g., any data variables or data records discussed in this disclosure), etc. The operating system 316 may facilitate resource management and operation of the computer system 301. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 317 may facilitate display, execution, interaction, manipulation, or operation of program components through textual or graphical facilities. For example, user interfaces may provide computer interaction interface elements on a display system operatively connected to the computer system 301, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 301 may implement a web browser 318 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 301 may implement a mail server 319 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 301 may implement a mail client 320 stored program component. The mail client may be a mail viewing application, such as Apple Mail, Microsoft Entourage, Microsoft Outlook, Mozilla Thunderbird, etc.

In some embodiments, computer system 301 may store user/application data 321, such as the data, variables, records, etc. (e.g., business rules, interface specifications, stubs, configuration files, dashboard statistics, etc.) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of any computer or database component may be combined, consolidated, or distributed in any working combination.

The specification has described Dynamic Java Message Service Emulator. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A processor-implemented Dynamic Java Message Service Emulation method, comprising:
   instantiating, via one or more hardware processors, a Dynamic Enterprise Java Bean (DEJB);
   receiving, from a source system, via the one or more hardware processors, a request at the DEJB, the request queued in a request queue of the source system, the request received in accordance with a priority level of the request;
   identifying, based on the request, via the one or more hardware processors, a system for which system integration testing is to be performed;
   generating, based on identifying the system for which system integration testing is to be performed, via the one or more hardware processors, a query for business rules for processing the request;
   receiving, responsive to the query, via the one or more hardware processors and via a Java Bean framework, the business rules;
   configuring, via the one or more hardware processors and the Java Bean framework, the DEJB using the business rules;
   processing, via the one or more hardware processors, the request using the configured DEJB to perform integration testing of the system identified based on the request and generate a respective response; and
   providing, via the one or more hardware processors, the response as an output of the configured DEJB.

2. The method of claim 1, wherein the request includes a Java Message Service formatted according to an extensible markup language (XML).

3. The method of claim 1, wherein the DEJB is configured using the business rules to emulate the system for which system integration testing is to be performed.

4. The method of claim 3, wherein the system for which system integration testing is to be performed is heterogeneous to a system from which the request is received.

5. The method of claim 1, wherein:
   the business rules are stored in a file formatted according to XML; and
   the query for the business rules is formatted according to an XML query language.

6. The method of claim 5, further comprising:
   receiving, via the one or more hardware processors, a portion of the file formatted according to XML as the business rules; and
   configuring, via the one or more hardware processors, the DEJB according to the portion of the file formatted according to XML.

7. The method of claim 1, further comprising:
   generating, via the one or more hardware processors, a configuration file in XML format including a handler of the business rules and a reply destination;
   wherein the DEJB is configured using a configuration file comprised in the Java Bean framework;
   wherein the response is transmitted to the reply destination.

8. The method of claim 1, further comprising:
   processing, via the one or more hardware processors, statistical analysis of data including the request, the response, and the business rules using the configured DEJB; and
   providing, via the one or more hardware processors, an indication of an integration status based on a result of the statistical analysis.

9. The method of claim 1, wherein the reply destination is determined based on Message Driven Bean.

10. The method of claim 1, wherein the response is generated in part based on a target destination of the response.

11. The method of claim 10, wherein the target destination is the source system.

12. The method of claim 1,
wherein providing the response comprises sending the response, via one or more hardware processors, to the source system, and
wherein the response is an XML message.

13. A non-transitory computer-readable medium storing a set of instructions that, when executed by a hardware processor, causes the hardware processor to perform a Dynamic Java Message Service Emulation method, the method comprising:
instantiating a Dynamic Enterprise Java Bean (DEJB);
receiving, from a source system, a request at the DEJB, the request queued in a request queue of the source system, the request received in accordance with a priority level of the request;
identifying, based on the request, a system for which system integration testing is to be performed;
generating, based on identifying the system for which system integration testing is to be performed, a query for business rules for processing the request;
receiving, responsive to the query, via a Java Bean framework, the business rules;
configuring, via the Java Bean framework, the DEJB using the business rules;
processing the request using the configured DEJB to perform integration testing of the system identified based on the request and generate a respective response; and
providing, via the hardware processor, the response as an output of the configured DEJB.

14. The medium of claim 13, wherein the request includes a Java Message Service message formatted according to XML.

15. The medium of claim 13, wherein the DEJB is configured using the business rules to emulate the system for which system integration testing is to be performed.

16. The medium of claim 15, wherein the system for which system integration testing is to be performed is heterogeneous to a system from which the request is received.

17. The medium of claim 13, wherein:
the business rules are stored in a file formatted according to XML; and
the query for the business rules is formatted according to an XML query language.

18. The medium of claim 17, further comprising instructions that cause the hardware processor to perform:
receiving a portion of the file formatted according to XML as the business rules; and
configuring the DEJB according to the portion of the file formatted according to XML.

19. A Dynamic Java Message Service Emulation system comprising:
one or more hardware processors; and
a computer-readable medium storing instructions that, when executed by the one or more hardware processors, cause the one or more hardware processors to perform operations comprising:
instantiating a Dynamic Enterprise Java Bean (DEJB);
receiving, from a source system, a request at the DEJB, the request queued in a request queue of the source system, the request received in accordance with a priority level of the request;
identifying, based on the request, a system for which system integration testing is to be performed;
generating, based on identifying the system for which system integration testing is to be performed, a query for business rules for processing the request;
receiving, in response to the query, via a Java Bean framework, the business rules;
configuring, via the Java Bean framework, the DEJB using the business rules;
processing, via the one or more hardware processors, the request using the configured DEJB to perform integration testing of the system identified based on the request and generate a response; and
providing, via the one or more hardware processors, the response as an output of the configured DEJB.

20. The system of claim 19, wherein the request includes a Java Message Service message formatted according to XML.

21. The system of claim 19, wherein the DEJB is configured using the business rules to emulate the system for which system integration testing is to be performed.

22. The system of claim 21, wherein the system for which system integration testing is to be performed is heterogeneous to a system from which the request is received.

23. The system of claim 19, wherein:
the business rules are stored in a file formatted according to XML; and
the query for the business rules is formatted according to an XML query language.

* * * * *